United States Patent [19]
Charles et al.

[11] Patent Number: 5,934,554
[45] Date of Patent: Aug. 10, 1999

[54] ROOM TEMPERATURE SENSOR AND THERMOSTAT CONTROL DEVICE

[75] Inventors: Donald E. Charles, Wauconda; Christopher Wojtowicz, Mt. Prospect; Kenneth F. Wolfinger, Skokie, all of Ill.

[73] Assignee: Siemens Building Technologies, Inc., Buffalo Grove, Ill.

[21] Appl. No.: 09/119,924

[22] Filed: Jul. 21, 1998

Related U.S. Application Data

[62] Division of application No. 08/684,551, Jul. 19, 1996, Pat. No. 5,816,492.

[51] Int. Cl.$^6$ ............................... F24F 3/00; G05D 23/00
[52] U.S. Cl. .......................... 236/46 R; 236/51; 165/209
[58] Field of Search ................................... 236/46 R, 51, 236/47; 165/209

[56] References Cited

U.S. PATENT DOCUMENTS

| | | | |
|---|---|---|---|
| 3,043,517 | 7/1962 | Hanna | 236/46 R |
| 3,351,280 | 11/1967 | Harris | 236/46 R |
| 4,314,666 | 2/1982 | Schotten | 236/78 D |
| 4,379,520 | 4/1983 | Tomsu | 236/94 X |
| 4,395,139 | 7/1983 | Namiki et al. | 374/183 X |
| 4,406,550 | 9/1983 | Gray | 374/110 |
| 4,455,096 | 6/1984 | Brandstedt | 374/170 |
| 4,466,749 | 8/1984 | Cunningham et al. | 374/134 |
| 4,471,354 | 9/1984 | Smith | 128/631 X |
| 4,475,685 | 10/1984 | Grimado et al. | 236/46 R |
| 4,480,312 | 10/1984 | Wingate | 374/170 X |
| 4,504,922 | 3/1985 | Johnson et al. | 374/170 X |
| 4,505,600 | 3/1985 | Suzuki et al. | 374/170 X |
| 4,562,554 | 12/1985 | Stixrud et al. | 364/900 |
| 4,588,308 | 5/1986 | Saito | 374/181 |
| 4,607,962 | 8/1986 | Nagao et al. | 374/103 |
| 4,728,199 | 3/1988 | Murai et al. | 374/163 X |
| 4,730,941 | 3/1988 | Levine et al. | 236/94 X |
| 4,838,707 | 6/1989 | Ozawa et al. | 374/171 |
| 4,882,564 | 11/1989 | Monroe et al. | 340/449 |
| 5,085,526 | 2/1992 | Sawtell et al. | 374/101 |
| 5,116,136 | 5/1992 | Newman et al. | 374/102 |
| 5,135,045 | 8/1992 | Moon | 236/51 X |
| 5,249,863 | 10/1993 | Brown | 374/102 |
| 5,495,722 | 3/1996 | Manson et al. | 236/94 X |
| 5,682,949 | 11/1997 | Ratcliffe et al. | 236/51 X |

FOREIGN PATENT DOCUMENTS

| | | |
|---|---|---|
| 1277207 | 6/1972 | United Kingdom . |
| 2122390 | 1/1984 | United Kingdom . |

Primary Examiner—William Wayner
Attorney, Agent, or Firm—Greer, Burns & Crain, LLP

[57] ABSTRACT

A thermostat control having improved user controls wherein an analog version contains a binary coded switch for selectively setting a setpoint temperature. The binary coded switch is configured to have discrete positions corresponding to a plurality of setpoint temperature settings. It contains, among other things, a resistor network configured to produce a setpoint signal indicative of the binary coded switch position and a setpoint adjust switch for setting the binary coded switch position. Also, digital version having a man-machine interface port, wherein point information from a controller can be viewed and modified with the thermostat control device controls when a hardware passkey is inserted into the man-machine interface port.

4 Claims, 10 Drawing Sheets

ROOM TEMPERATURE SENSOR AND THERMOSTAT CONTROL DEVICE

This is a division of application Ser. No. 08/684,551, filed Jul. 19, 1996, now U.S. Pat. No. 5,816,492.

FIELD OF THE INVENTION

The present invention relates generally to electronic room temperature sensors and thermostat control devices. More particularly, the present invention relates to room temperature sensors and thermostat control devices having improved user controls.

BACKGROUND OF THE INVENTION

Heating and cooling systems in large office buildings or apartment complexes are generally controlled, in individual rooms, by room temperature sensors and thermostat control devices. Such thermostat control devices generally include a setpoint control device, for setting a desired room temperature, a room temperature sensor, for sensing the actual room temperature, and a communication mechanism for sending the setpoint and temperature information to a controller for determining the difference between the desired and actual room temperature and for sending a control signal to the central heating and cooling system indicating temperature adjustment needs.

From a users perspective, a thermostat control device's main function is setpoint adjustment. Setpoint controls are generally regarded as the main interface between the user and the device. Therefore, readability and ease of use of the setpoint controls are of the utmost importance.

Setpoint controls include a display device (in one or more embodiments), for displaying the current room temperature and setpoint, and a set point adjustment control, for adjusting the setpoint. Traditionally, setpoint adjustment has been accomplished by a controlling device reading either a resistance or a current which corresponds to a particular setpoint temperature.

Potentiometers have been used for setpoint adjustment when the controlling device reads a resistance. However, because the resistance is continuously variable in a potentiometer, repeatability (the specific resistance at a particular point of travel) is usually poor. Also, the temperature coefficient associated with low cost potentiometers is poor adding further inaccuracy.

Circuits containing transistors, resistors and potentiometers have been used for setpoint adjustment when the controlling device reads a current. A variable resistance potentiometer, without any additional circuitry, would result in a nonlinear current change as a function of position. Therefore, additional active circuitry is required to produce a linear current change as a function of position. In addition to the limitations of potentiometers, as described above, the active circuitry produces additional inaccuracies and cost.

Display devices have progressed from mercury-based thermometers and dials to liquid crystal display (LCD) devices. Once again, accuracy and ease of use are essential. The user must be able to easily read and operate the display device in order for it to be effective. Even the most efficient heating/cooling systems will be ineffective if the user has difficulty operating the device properly.

The heating and cooling systems mentioned above generally maintain a database of setpoint and actual temperatures for the individual rooms at controllers. The database values can usually be viewed and manipulated using a central console or maintenance terminal. In this way, a technician or building manager can adjust the setpoints in individual rooms from one central location. In addition, the maintenance terminals can be used to upload software upgrades as well as perform other maintenance functions. The maintenance terminal is generally connected to the controller in some central location which can be difficult to get to.

Accordingly, it is a general object of the present invention to provide an improved thermostat control device adapted for controlling the temperature in a space which is accurate and easy to use.

It is another object of the present invention to provide an improved setpoint control device which is accurate and easy to use.

It is still another object of the present invention to provide an improved thermostat control device which can also be used as a maintenance terminal for viewing and adjusting database points stored at the controller to which the thermostat control device is attached.

It is a further object of the present invention to provide an improved thermostat control device which contains a man-machine interface port for connecting a maintenance terminal to the temperature control system.

Other features and advantages of the present invention will be apparent from the following description taken in conjunction with the accompanying drawings.

SUMMARY OF THE INVENTION

In order to achieve the foregoing objects, the present invention provides a thermostat control device with a binary coded switch for selectively setting a setpoint temperature. The binary coded switch in several embodiments is configured to have discrete positions corresponding to a plurality of setpoint temperature settings. It contains, among other things, a resistor network configured to produce a setpoint signal indicative of the binary coded switch position. It also includes a mechanical wiper slider assembly (a setpoint adjust switch) for setting the binary coded switch position.

A series resistor network produces a resistance, corresponding to a binary coded switch position. This is used by controlling devices which read setpoint temperatures as a function of resistance. The binary coded switch performs the function of a linear position dependent variable resistor similar to a potentiometer. However, in a preferred embodiment a 6-bit switch is used to provide up to 64 ($2^6$) discrete positions with an accuracy limited by the precision of the resistors used. Using only six resistors, in the resistor network, with one percent tolerance would yield 64 one percent (or less) discrete resistance values making the resistance at a particular position, or point of travel, constant and very repeatable.

The series resistor network consists of six resistors connected in series. The resistor values are binary weighted (multiples of 1, 2, 4, 8, etc.) so as to produce a linear resistance change as a function of switch position. The resistors are connected in parallel with mechanical switches, each resistor being connected in parallel to one switch. The switches are opened/closed in a binary coded fashion by the setpoint adjust switch. When a switch is closed its parallel resistance is shunted. When a switch is open its parallel resistance is in the series resistor network. An intercept resistor is also provided and is connected in series with the series resistor network to provide an intercept resistance when all switches are closed. Therefore, the series resistor network produces a resistance setpoint signal indicative of the position of the binary coded switch.

A parallel resistor network produces a current value corresponding to a binary coded switch position, for systems in which the controlling device reads the setpoint temperature as a function of current. In this case, the binary coded switch performs the function of a position dependent current sink.

In this embodiment, six resistors are connected in parallel. The resistor values are binary weighted (multiples of 1, 2, 4, 8, etc.) to produce discrete current values that vary linearly as a function of position. The parallel resistor network provides an inexpensive means of obtaining up to 64 ($2^6$) discrete positions each with an accuracy limited only by the precision of the resistors used. Using only six passive components (resistors) with one percent tolerance would yield 64 one percent (or less) discrete current values that vary linearly as a function of position and at a particular position, or point of travel, will be constant and very repeatable.

The resistors are connected in series with mechanical switches, one switch being connected to each resistor. A setpoint adjust switch is configured to open/close the switches in a binary coded fashion. When a switch is closed, its series resister is added to the resistor network in parallel. In this manner the resistance will vary nonlinearly over the range while the current change will be linear. An intercept resistor is connected in parallel with the resistor network to provide an intercept current when all switches are open. Therefore, the parallel resistor network produces a current setpoint signal indicative of the binary coded switch position.

The thermostat control device also includes a temperature sensor for measuring the temperature in a space and generating a temperature signal. The temperature signal is also sent to the controlling device. Multiple thermostat control devices can be connected to a single controlling device. The controlling device stores the setpoint temperature and measured temperature for all thermostat control devices which are attached to it. It compares the setpoint temperatures and measured temperatures and controls the flow of warm/cool air to the spaces accordingly.

The thermostat control device can be operated in either a day mode or a night mode. During day mode operation the thermostat control device transmits a temperature and setpoint signal to the controller. The controller compares temperature and setpoint signals and adjusts the flow of warm/cool air appropriately. During night mode operation the controller compares the temperature signal from the thermostat control device with a night setpoint configured at the controller (or sometimes at the thermostat control device) for expected night occupancy. A mode override switch is provided on the thermostat control device for overriding night mode operation so that the controller, once again, uses the Day setpoint signal transmitted from the thermostat control device when adjusting the flow of warm/cool air.

In one embodiment, the display device on the thermostat control device is used to display the setpoint temperature and the measured temperature. The display device is configured to display temperatures in either metric or standard engineering units. The display device is also configured to display whether the thermostat control device is operating in day mode or night mode.

A man-machine interface port is provided on the thermostat control device for connecting a maintenance terminal to the controller. By placing man-machine interface ports on the thermostat control devices, routine maintenance can be performed at any thermostat control device location. No longer is a maintenance person required to find inconveniently placed controllers in order to perform tasks such as controller setpoint adjustment.

In another embodiment, the thermostat control device is configured with digital setpoint controls. A microprocessor is responsible for transmitting the setpoint to a networked controlling device. A man-machine interface port is included for connecting a man-machine computer to the controlling device and for placing the microprocessor in an idle state when the man-machine computer is plugged in. The man-machine computer is configured to communicate directly to the controlling device and may be used for monitoring and controlling inputs and outputs of the controlling device. The man-machine interface (MMI) port provided on the thermostat control device with digital setpoint controls is also configured for receiving a hardware passkey. The hardware passkey is a pencil-like hardware security device which allows access into the point database of the controlling device. When the passkey is inserted in the MMI port, database information from the controlling device is displayed on the display of the thermostat control device. This will enable the user to scroll through the point database stored in the controlling device and modify the database from the thermostat control device without the need for a maintenance terminal.

DESCRIPTION OF THE PREFERRED EMBODIMENT

Broadly stated, the present invention presents an improved thermostat control device. In the analog version, a binary coded switch is included for selectively setting a setpoint temperature. The binary coded switch contains a setpoint adjust switch, for setting the position of the binary coded switch, and a resistor network for producing a setpoint signal indicative of the binary coded switch position.

Preferred embodiments of an improved thermostat control device are described herebelow with reference to the drawings.

A series resistor network is provided for systems in which a controlling device reads setpoint temperature as a function of resistance. A parallel resistor network is provided for systems in which a controlling device reads setpoint temperature as a function of current. The resistor networks are configured to produce a setpoint signal which varies linearly over the range of the binary coded switch.

A digital thermostat control device is provided with a MMI port. The MMI port is configured to accept a hardware passkey. When the hardware passkey is inserted into the MMI port, point database information from the controlling device is displayed on the thermostat control device. The database information can be viewed and modified at the thermostat control device.

Figure 1:
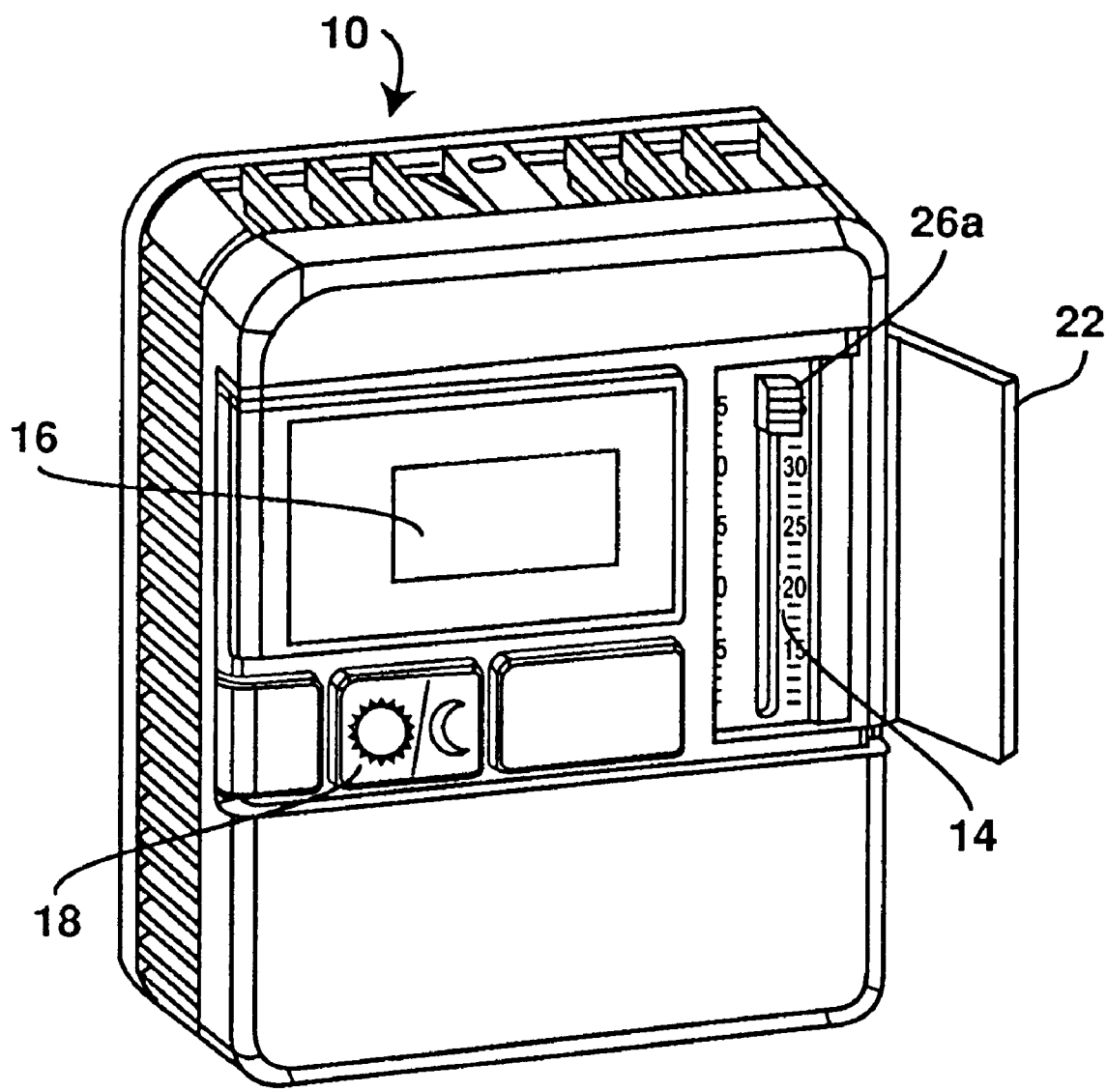
FIG. 1 is a perspective view showing a front panel of an analog thermostat control device in accordance with the present invention.
Figure 2:
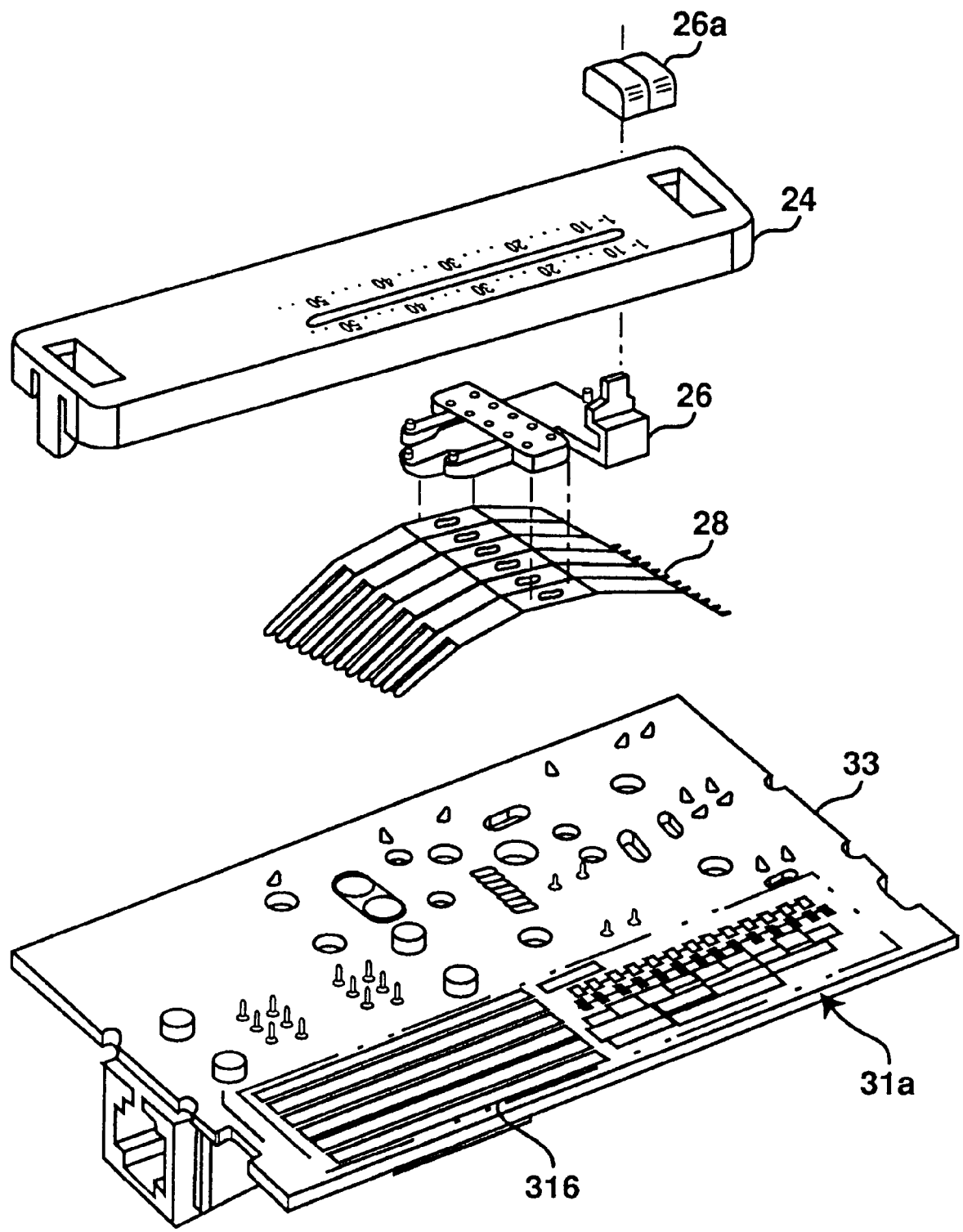
FIG. 2 is an exploded perspective view of a setpoint adjust switch.
Figure 3:
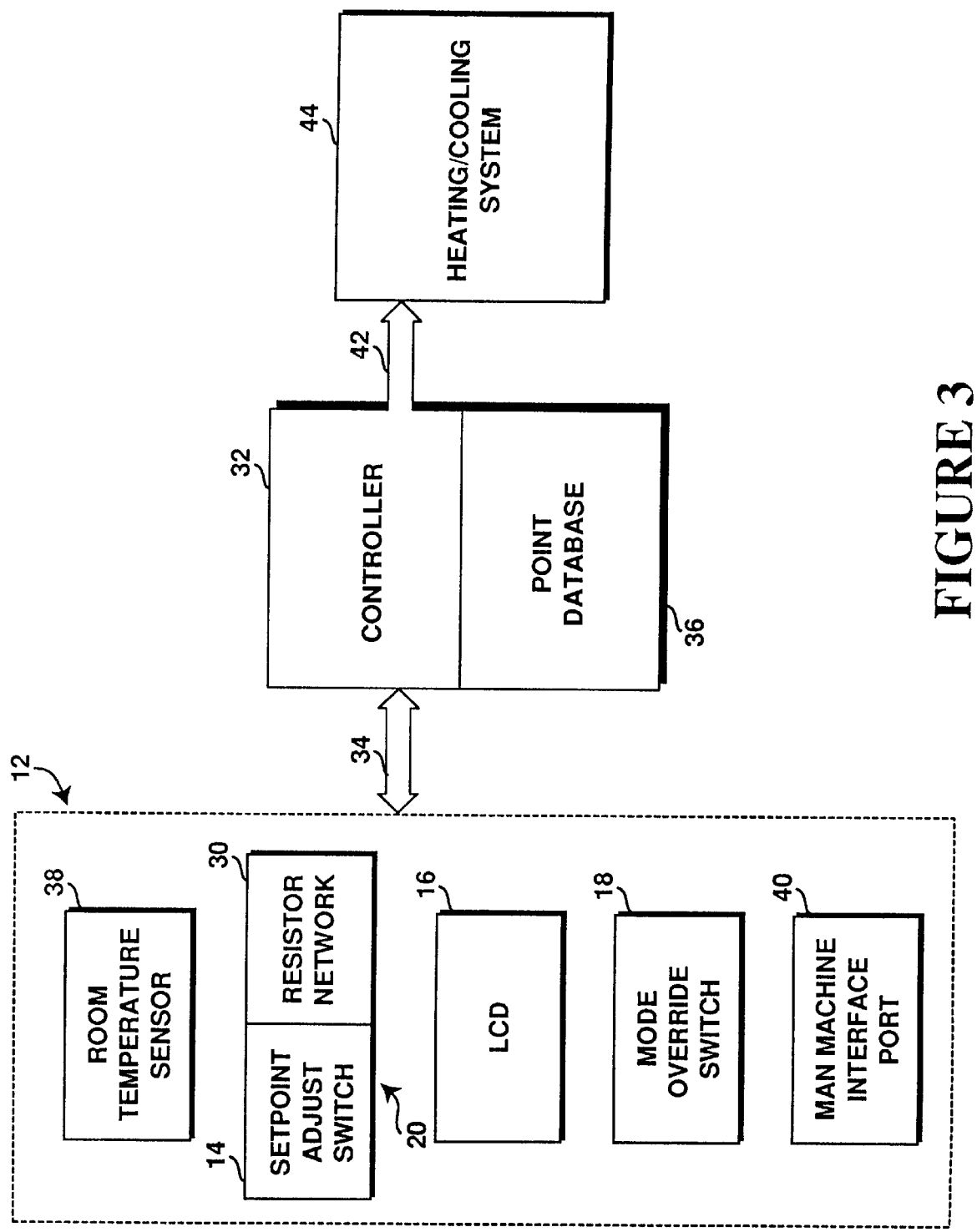
FIG. 3 is a block diagram of an analog thermostat control device in accordance with the present invention.

Turning now to the drawings, in particular FIGS. 1, 2 and 3, the front panel, a setpoint adjust switch and a schematic block diagram of the analog thermostat control device are shown respectively. Located on the front panel 10 of the Analog thermostat control device 12 is a setpoint adjust switch 14, an LCD display 16 and a mode override switch 18. The setpoint adjust switch 14 is used to adjust the position of a binary coded switch 20. The LCD display 16 is configured to display the room temperature.

In the preferred embodiment, the setpoint adjust switch 14 has 41 discrete positions. Each position corresponds to a setpoint temperature between and including 55° F. and 95° F. Therefore, the setpoint temperature is adjusted by adjusting the position of the binary coded switch 20 using the setpoint adjust switch 14. A switch cover door 22 is provided on the front panel, and is configured to enclose and protect the setpoint adjust switch 14 when closed.

As shown in FIG. 2, the setpoint adjust switch 14 consists of a housing 24, a wiper arm 26 and cap 26a, and a wiper 28. The wiper 28 has six separate electrically isolated blades which have opposite ends that contact six strips of conductive surfaces 31a and 31b. The user selects a setpoint temperature by moving the wiper arm 26 to a position corresponding to the desired setpoint temperature. In response, the wiper 28 closes mechanical switches located in a resistor network 30 that are connected using the binary coded conductive surfaces 31a and 31b of a printed circuit board 33. The left end of the blades of the wiper 28 contact one of the solid conductive strips 31b whereas the right end of each wiper blade will selectively contact various ones of the binary coded surfaces 31a as a function of the position of wiper 28 along its path of travel. A controller 32 polls the resistor network 30 at predetermined intervals reading a setpoint signal 34 generated by the resistor network 30 responsive to the position of the setpoint adjust switch 14. The controller 32 stores the setpoint information in a point database 36 along with other point information from all thermostat control devices connected to it.

The analog thermostat control device 12 also contains a room temperature sensor 38 and a MM port 40. The NMI port 40 is configured to accept a connection from a maintenance terminal. When the maintenance terminal is connected to the MMI port 40 the maintenance terminal takes control of the thermostat control device's operation. The maintenance terminal can then be used to perform routine maintenance on the controller 32, such as controller setpoint adjustment. When the maintenance terminal is unplugged from the MMI 40 the thermostat control device 12 resumes its normal operation.

The room temperature sensor 38 measures the actual temperature in a space and generates a temperature signal indicative thereof. The controller 32 also polls the room temperature sensor 38 at predetermined intervals reading the temperature signal. The controller 32 stores the measured temperature information in the point database 36 with the other point information.

The controller 32 compares the setpoint information and the measured temperature information stored in the point database 36 and generates a temperature adjust signal 42 which is sent to a heating/cooling unit 44. The temperature adjust signal 42 is indicative of the difference between the desired room temperature (setpoint temperature) and the actual room temperature (measured temperature). The heating/cooling unit 44 attempts to adjust the actual room temperature to be equal to the desired room temperature by supplying heated or cooled air to the space.

The controller 32 is also configured to have dual modes of operation, both a day mode and a night mode. During day mode operation, the controller 32 operates in the manner described above. In night mode operation, the controller 32 compares the measured temperature information to a night setpoint programmed into the point database. The night setpoint is configured to conserve energy by setting the night setpoint to reflect the reduced temperature control needed during periods when occupancy is usually reduced. The controller 32 is generally equipped with a timer which switches the mode of operation between day and night mode, and visa versa, according to a preprogrammed time schedule.

The analog thermostat control device's mode override switch 18 is used to override the controller 32 when it is in night mode. When the user overrides night mode, by pressing the mode override switch 18, the controller 32 switches back to comparing the measured temperature information to the setpoint information supplied by the thermostat control device 12 in calculating the temperature adjust signal 42.

Figure 4:
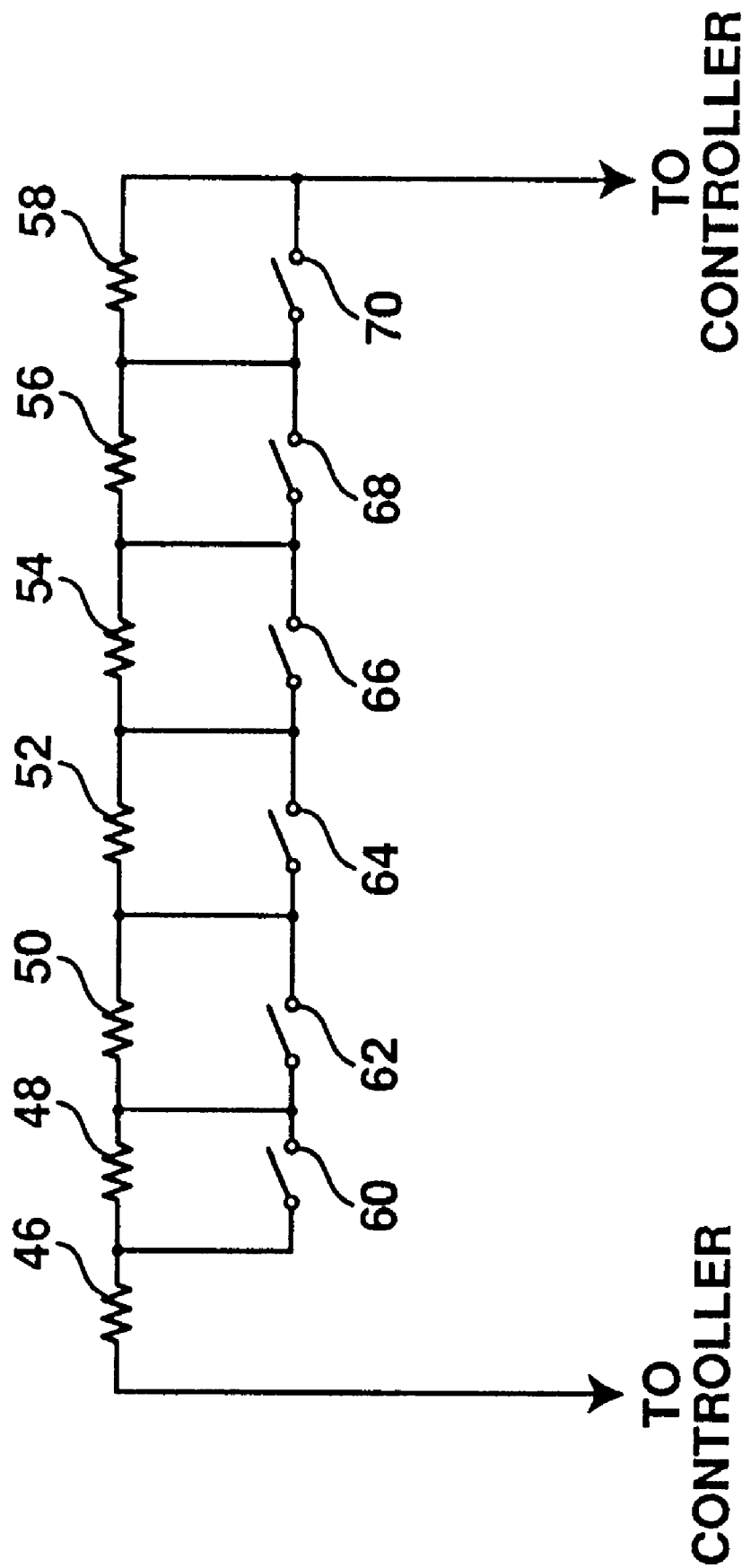
FIG. 4 is a circuit diagram of one embodiment of a binary coded switch including a series resistor network.

A series resistor network is shown in FIG. 4. Series resistor networks are desirable when the controller 32 is configured to read the setpoint temperature from the thermostat control device 12 as a function of resistance. In a 6-bit binary coded switch, an intercept resistor 46 is connected in series with 6 setpoint resistors 48, 50, 52, 54, 56 and 58. The setpoint resistor values are weighted in a binary fashion. In the preferred embodiment, setpoint resistor 48 has a value of 10.5 ohms (Ω), and setpoint resistors 50, 52, 54, 56 and 58 have values of 21.0 Ω, 42.2 Ω, 84.5 Ω, 169Ω and 340Ω respectively. Note that the setpoint resistors values are approximately binary weighted multiples of a primary value 10.5Ω, with coefficients of 1, 2, 4, 8, 16 and 32. Because actual EIA resistor values are not exact multiples of two, the standard 1% values closest to the ideal calculated values are used in the preferred embodiment.

A separate switch is connected in parallel with each setpoint resistor. The switches 60, 62, 64, 66, 68 and 70 are open by default but are configured to be closable by the setpoint adjust switch 14. When all switches are closed the intercept resistor 46 provides a minimum resistance value to be read by the controller 32. In the preferred embodiment, the intercept resistor 32 has a value of 866 Ω.

Figure 5:
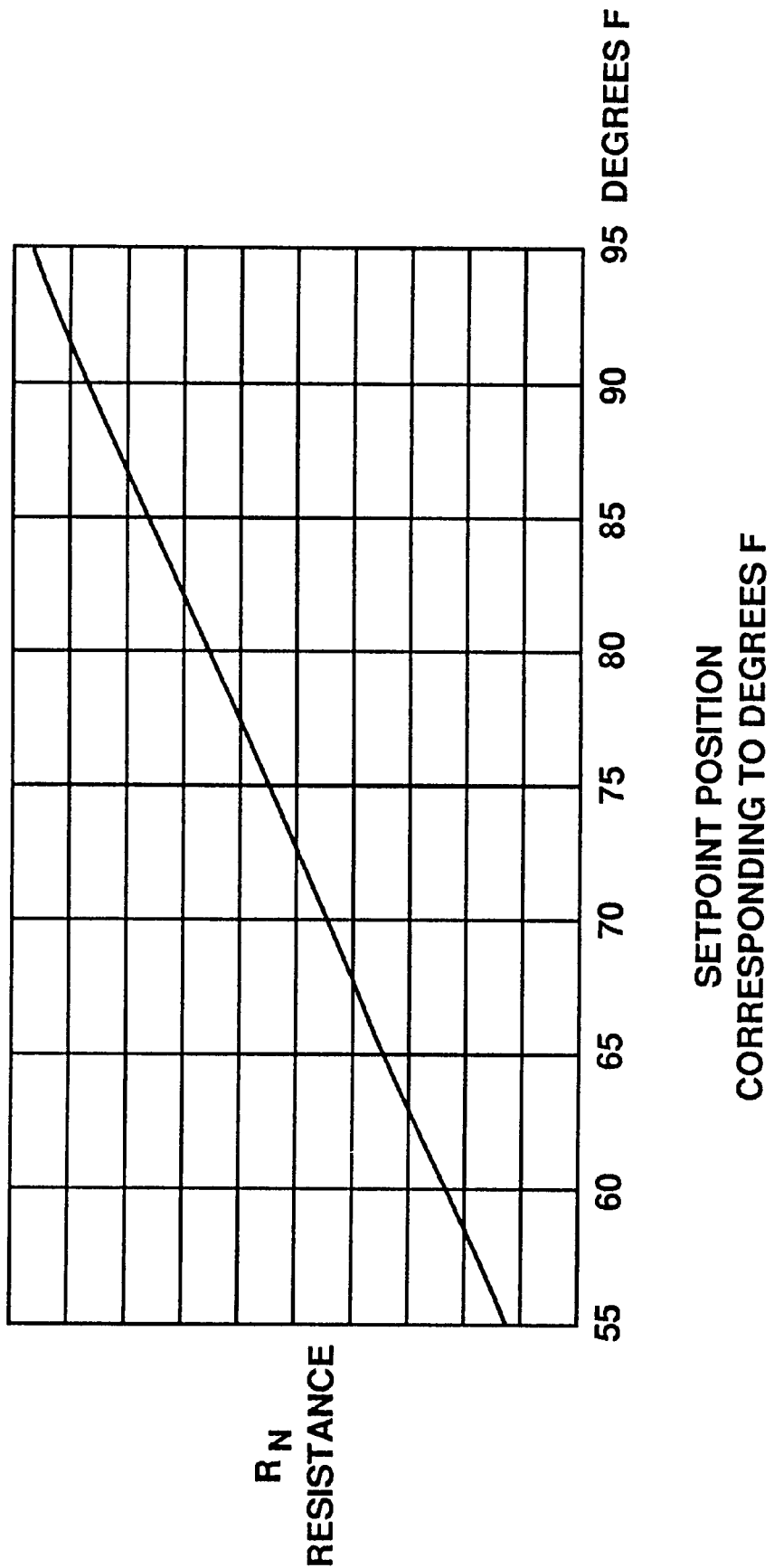
FIG. 5 is a two-dimensional graph showing how resistance of the series resistor network varies with respect to setpoint adjust switch position and setpoint temperature.

The setpoint adjust switch 14 is configured to open/close the switches in a binary coded fashion. In position zero, which corresponds to 55°, all switches are closed, which corresponds to a binary coded value of 64 (0=open, 1=closed). As the setpoint temperature is raised, by moving the setpoint adjust switch 14, switches are opened/closed in a binary coded fashion increasing the resistance of the resistor network 30 and decreasing the binary coded value. For example, in position 1, the switch 60 is opened, corresponding to binary coded value of 63; in position 2, switch 62 is opened and 60 is closed, in position 3 switches 60 and 62 are both opened; in position 4, switch 64 is opened and switches 60 and 62 are closed, and so on until in position 40, switches 68 and 66 are closed and all other switches are open. Therefore, the resistance read by the controller 32 varies with setpoint adjust switch position as shown in FIG. 5.

Figure 6:
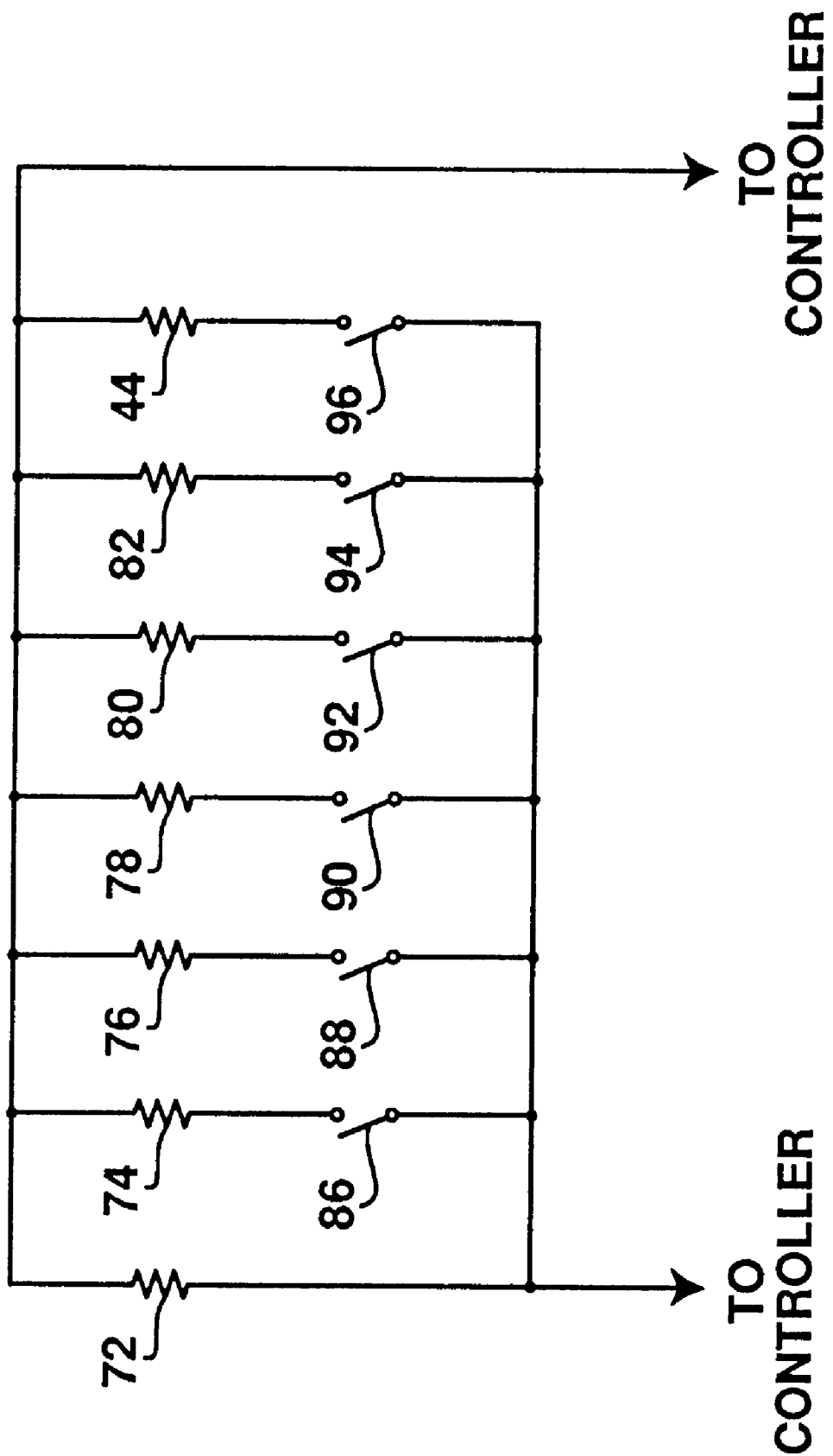
FIG. 6 is a circuit diagram of another embodiment of a binary coded switch including a parallel resistor network.

In a second embodiment shown in FIG. 6, a parallel resistor network is provided for systems in which the controller 32 reads the setpoint temperature as a function of current. In this embodiment, an intercept resistor 72 is connected in parallel with 6 parallel setpoint resistors 74, 76, 78, 80, 82 and 84. Again, the setpoint resistor values are weighted in a binary fashion. In this embodiment, setpoint resistor 74 has a value of 18.7 K$\Omega$, and setpoint resistors 76, 78, 80, 82 and 84 have values of 37.4 K$\Omega$, 75.0 K$\Omega$, 150 K$\Omega$, 301 K$\Omega$ and 604 K$\Omega$ respectively. Note that the setpoint resistor values are approximately binary weighted multiples of a primary value 18.7 K$\Omega$, with coefficients of 1, 2, 4, 8, 16 and 32.

A separate switch is connected in series with each parallel setpoint resistor. The switches 86, 88, 90, 92, 94 and 96 are open by default but are configured to be closable by the setpoint adjust switch 14. When all switches are closed, the intercept resistor 72 produces a maximum current value to be read by the controller 32. In this embodiment, the intercept resistor 72 has a value of 14.3 K$\Omega$.

Figure 7:
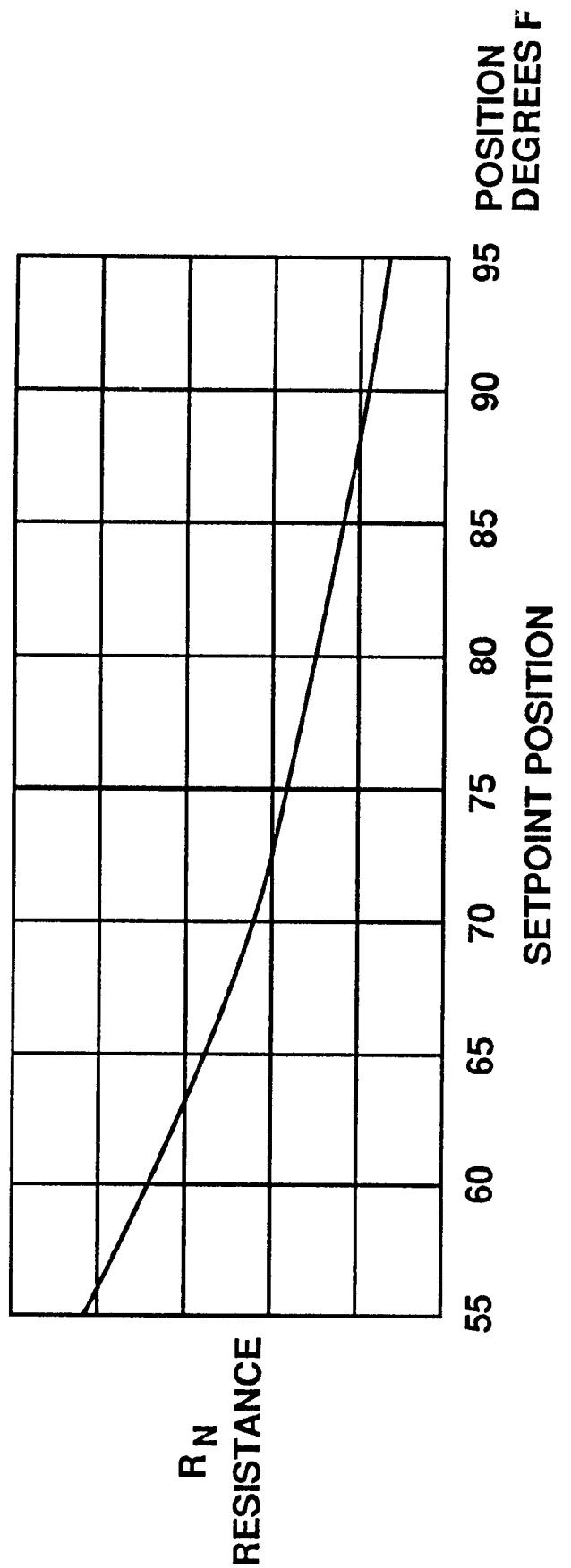
FIG. 7 is a two-dimensional graph showing how resistance of the parallel resistor network varies with respect to setpoint adjust switch position and setpoint temperature.
Figure 8:
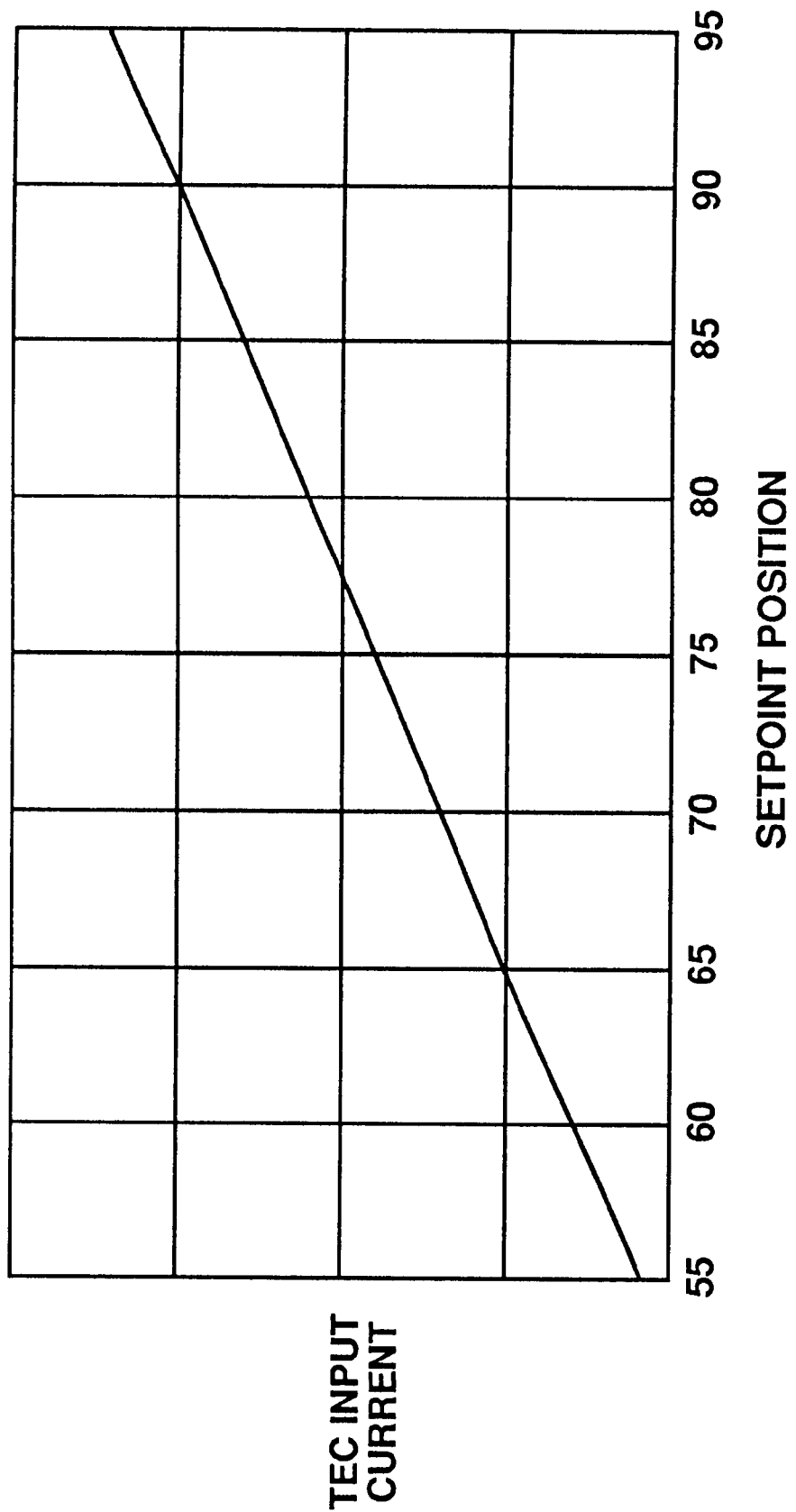
FIG. 8. is a two-dimensional graph showing how controller read current of the parallel resistor network varies with respect to setpoint adjust switch position and setpoint temperature.

The setpoint adjust switch 14 is configured to close the parallel switches in a binary coded fashion. In position zero, which corresponds to 55°, all switches are open corresponding to a binary coded value of zero. As the setpoint temperature is raised, by moving the setpoint adjust switch 14, switches are opened/closed in a binary coded fashion, increasing the binary value, decreasing the resistance and increasing the current of the resistor network 30. The resistance of the parallel resistance network varies non-linearly with respect to setpoint adjust switch position as shown in FIG. 7. This produces the linear relationship between controller read current and setpoint adjust switch position shown in FIG. 8.

Figure 9:
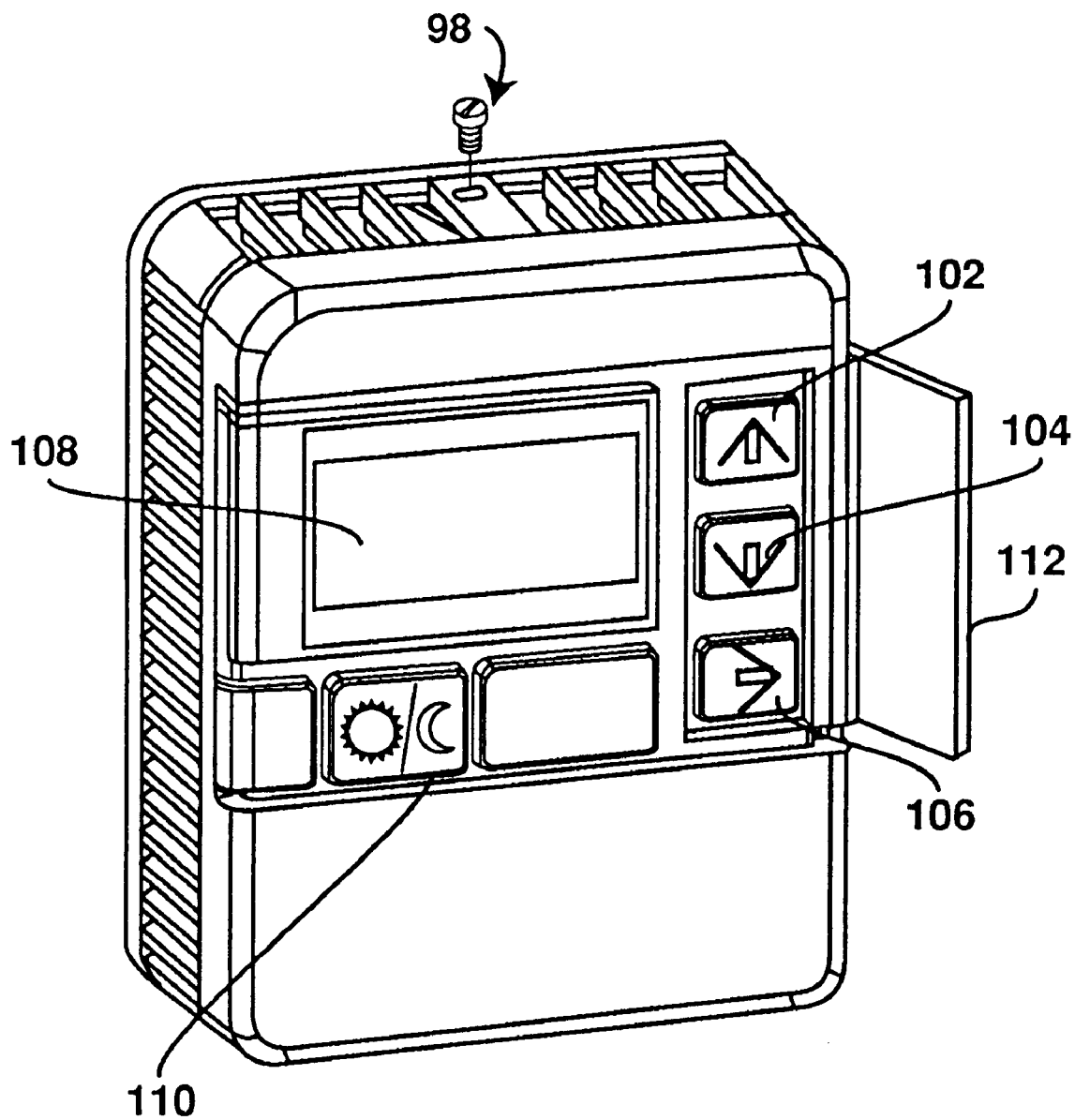
FIG. 9 is a perspective view showing a front panel of a digital thermostat control device in accordance with the present invention.
Figure 10:
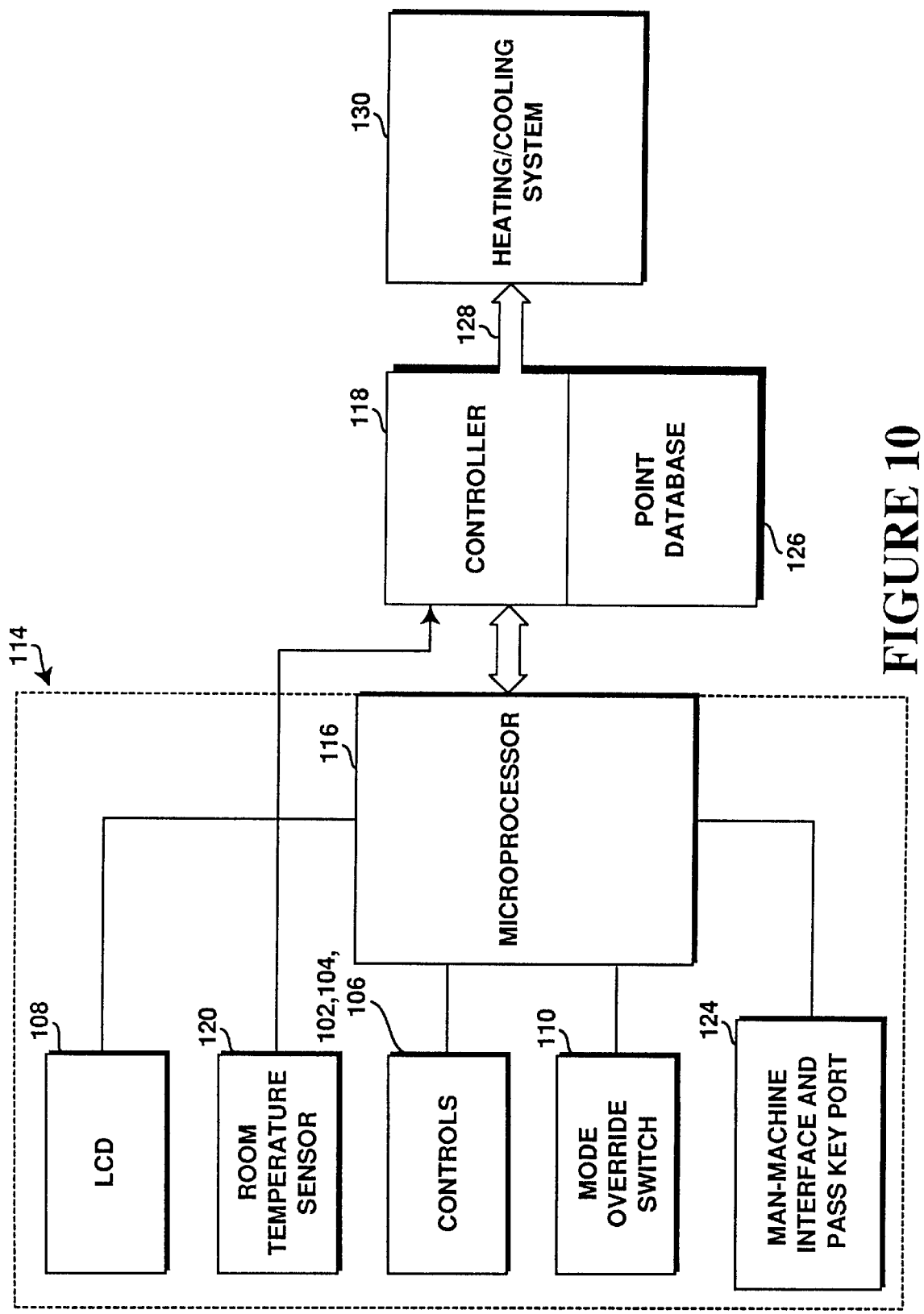
FIG. 10 is a block diagram of a digital room temperature sensor and thermostat control device in accordance with the present invention.

FIGS. 9 and 10 show the front panel and a block diagram of a digital thermostat control device. Located on the front panel 98 of the digital thermostat control device 114 are setpoint adjust controls 102 and 104, a display control key 106, an LCD display 108, a mode override switch 110 and a controls cover 112. The up-arrow setpoint adjust control 102 is used to raise the setpoint temperature. The down-arrow setpoint adjust 104 is used to lower the setpoint temperature. The controls cover 112 is configured to enclose and protect the setpoint adjust controls 102 and 104 and the display control key 106.

The LCD display 108 is configured to display the setpoint temperature or any other controller database point called a "critical point", room temperature and mode of operation. The default display shows the room temperature and mode of operation. However, the user can select views showing critical point and mode of operation or room temperature, setpoint and mode of operation. In this embodiment, the digital thermostat control device 114 contains a microprocessor 116 for maintaining and transmitting setpoint temperature information to a controller 118. It also contains a room temperature sensor 120, and a man-machine/passkey interface port 124. The room temperature sensor 120 measures the actual temperature in a space and generates a temperature signal indicative thereof. The microprocessor generates a setpoint temperature signal indicative of a setpoint temperature set by the setpoint adjust controls 102 and 104 and transmits the setpoint temperature signal to the controller. The controller reads the temperature signal directly from the room temperature sensor. The controller 118 stores the measured temperature and setpoint temperature information in a point database 126 with other point information.

The controller 118 compares the setpoint information and the measured temperature information stored in the point database 126 and generates a temperature adjust signal 128 which is sent to a heating/cooling unit 130. The temperature adjust signal 128 is indicative of the difference between the desired room temperature (setpoint temperature) and the actual room temperature (measured temperature). The heating/cooling unit 130 attempts to adjust the actual room temperature to be equal to the desired room temperature by supplying heated or cooled air to the space.

Again, the controller 118 is configured to have dual modes of operation, both a day mode and a night mode, and the mode override switch 110 is configured to override the night mode. The digital thermostat control device 114 also contains a man-machine interface port 124, similar to the analog thermostat control device 12, for connecting a maintenance terminal for use in performing maintenance tasks on the thermostat control device 114 and the controller 118. When a maintenance terminal is plugged into the MMI port 124, the microprocessor 116 is placed in an idle state and the maintenance terminal assumes control. When the maintenance terminal is disconnected the microprocessor 116 and the thermostat control device 114 resume normal operation.

In an effort to make it easier to maintain the point database 126, there for port 124 is provided on the digital thermostat control device 114. The MMI port 124 is configured for receiving a hardware passkey. The hardware passkey is a pencil-shaped hardware device which, when inserted in the MMI port, allows the user access into the controller point database 126 from the digital thermostat control device 114. In the preferred embodiment, the hardware passkey is terminated on one end with a modular plug which has two wires soldered together. Upon sensing connection to the man-machine interface port 124 the microprocessor 116 goes into a point display mode where the point information from the point database 126 is displayed on the LCD 108 of the thermostat control device 114. The user can scroll through the point information by using the display control keys 102 and 104 and can modify the point information using the setpoint adjust controls 102, 104 and 106. In the point display mode the user may set up the normal idle display to display temperature and/or some (critical) point in the database, or no temperature and no other point. When a critical point is displayed, the display alternately displays the point value and the point's unit of measurement. When the hardware passkey is removed from the MMI port 124 the thermostat control device resumes its normal operation.

It will be appreciated that the above-disclosed embodiments are well calculated to achieve the aforementioned objectives of the present invention. In addition, it is evident that those skilled in the art, once given the benefit of the foregoing disclosure, may now make modifications of the specific embodiments described herein without departing from the spirit of the present invention. Such modifications are considered within the scope of the present invention which is limited solely by the scope and spirit of the appended claims.

What is claimed is:

1. A thermostat control device adapted for use in controlling the temperature of a space by a temperature control system, the device comprising:

means for measuring the temperature in the space and generating a temperature signal indicative thereof;

means for setting a setpoint temperature and generating a setpoint signal indicative thereof;

a microprocessor for transmitting said setpoint signal to a networked temperature control system;

means for disabling of setpoint signals when the temperature control system switches to a night mode of operation wherein the temperature control system controls setpoint temperature setting;

means for overriding the temperature control system when the temperature control system is in night mode, so that the thermostat control device controls setpoint temperature setting;

a liquid crystal display for displaying said measured temperature and/or said critical point, and mode of operation;

means for switching temperature display mode between metric and standard engineering units;

means for storing said setpoint temperature, mode of operation and display mode;

a display driver for driving said liquid crystal display under said microprocessor control; and a man-machine interface port for receiving a hardware passkey whereby when said passkey is inserted in said MMI port, database information from said networked temperature control system is displayed on said liquid crystal display.

2. A thermostat control device according to claim 1 wherein the device further comprising:

a man-machine interface port for connecting a man-machine interface computer to said networked temperature control system and placing said microprocessor in an idle state when said man-machine interface computer is connected to said man-machine interface port so that said man-machine interface computer may communicate directly with said networked temperature control system.

3. A thermostat control device according to claim 1 wherein the device further comprising:

means for retrieving said stored setpoint temperature from said means for storing upon initial power up or after a power failure; and means for restoring said setpoint temperature with said stored setpoint temperature.

4. A thermostat control device according to claim 1 wherein the device further comprising:

means for setting said setpoint temperature to a predetermined default setpoint value when said means for storing does not contain a setpoint temperature.

* * * * *

UNITED STATES PATENT AND TRADEMARK OFFICE
CERTIFICATE OF CORRECTION

PATENT NO. : 5,934,554
DATED : August 10, 1999
INVENTOR(S) : Charles et al.

It is certified that error appears in the above-identified patent and that said Letters Patent is hereby corrected as shown below:

Column 5, line 58, delete "MM" and insert --MMI--.

Column 5, line 58, delete "NMI" and insert --MMI--.

Column 8, line 35, delete "there fore" and insert --the--.

Signed and Sealed this

Twenty-fourth Day of October, 2000

Attest:

Q. TODD DICKINSON

*Attesting Officer*   *Director of Patents and Trademarks*